US011350239B2

(12) United States Patent
MacNeille et al.

(10) Patent No.: US 11,350,239 B2
(45) Date of Patent: May 31, 2022

(54) SMART MMWAVE C-V2X ANTENNA

(71) Applicant: FORD GLOBAL TECHNOLOGIES, LLC, Dearborn, MI (US)

(72) Inventors: Perry Robinson MacNeille, Lathrup Village, MI (US); Sandeep Sasidharan, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 351 days.

(21) Appl. No.: 16/514,415

(22) Filed: Jul. 17, 2019

(65) Prior Publication Data
US 2021/0021959 A1    Jan. 21, 2021

(51) Int. Cl.
*H04W 4/02* (2018.01)
*H04N 5/225* (2006.01)
(Continued)

(52) U.S. Cl.
CPC ............. *H04W 4/023* (2013.01); *G06T 7/337* (2017.01); *G06T 7/74* (2017.01); *H01Q 1/3233* (2013.01);
(Continued)

(58) Field of Classification Search
CPC ............... H04N 5/2257; H04N 5/2253; H04N 5/23229; G06T 7/337; G06T 7/74;
(Continued)

(56) References Cited

U.S. PATENT DOCUMENTS

| 5,512,901 A * | 4/1996 | Chen ..................... G01S 13/931 342/175 |
| 2003/0234720 A1* | 12/2003 | MacNeille ............. G08G 1/161 340/435 |

(Continued)

OTHER PUBLICATIONS

Lee et al., An Empirical Study on Ad Hoc Performance of DSRC and Wi-Fi Vehicular Communications, Nov. 28, 2013, SAGE Publishing, Advances in Vehicular Ad Hoc Networking and Applications, whole document (Year: 2013).*

(Continued)

*Primary Examiner* — Un C Cho
*Assistant Examiner* — Jose L Perez
(74) *Attorney, Agent, or Firm* — Michael J. Spenner; Brooks Kushman P.C.

(57) ABSTRACT

A vehicle includes a millimeter wave (mmWave) antenna, including a millimeter wave (mmWave) antenna, including a plurality of light elements and a plurality of active antenna elements in a predefined configuration surrounding a lensless camera element. The vehicle further includes an antenna controller configured to receive an image of a second mmWave antenna of a second vehicle via the lensless camera of the mmWave antenna, identify a scale and angle of rotation between the mmWave antenna and the second mmWave antenna based on the image, compute phase angles for the active antenna elements of the mmWave antenna according to the scale and angle of rotation, and transmit data using the active antenna elements to the second vehicle, according to the computed phase angles, to form a beam (Continued)

targeted at the second mmWave antenna of the second vehicle.

13 Claims, 11 Drawing Sheets

(51) Int. Cl.
| | |
|---|---|
| *G06T 7/73* | (2017.01) |
| *G06T 7/33* | (2017.01) |
| *H04W 4/46* | (2018.01) |
| *H04N 5/232* | (2006.01) |
| *H01Q 1/32* | (2006.01) |
| *H01Q 3/36* | (2006.01) |
| *H04W 84/00* | (2009.01) |

(52) U.S. Cl.
CPC ............ *H01Q 3/36* (2013.01); *H04N 5/2253* (2013.01); *H04N 5/23229* (2013.01); *H04W 4/46* (2018.02); *H04W 84/005* (2013.01)

(58) Field of Classification Search
CPC ..... H04W 4/46; H04W 4/023; H04W 84/005; H01Q 3/36; H01Q 3/2605; H01Q 1/3233
See application file for complete search history.

(56) References Cited

U.S. PATENT DOCUMENTS

| | | | |
|---|---|---|---|
| 2004/0218815 A1* | 11/2004 | Iizuka | G06K 9/522 |
| | | | 382/209 |
| 2010/0214085 A1* | 8/2010 | Avery | G08G 1/161 |
| | | | 340/435 |
| 2012/0076435 A1* | 3/2012 | Sharma | G06K 9/6206 |
| | | | 382/277 |
| 2016/0205501 A1* | 7/2016 | Lee | H04W 48/16 |
| | | | 455/457 |
| 2016/0231746 A1* | 8/2016 | Hazelton | G01S 13/867 |
| 2016/0277601 A1* | 9/2016 | Seymour | H04N 7/181 |
| 2017/0117628 A1* | 4/2017 | Banasky | H01Q 21/28 |
| 2017/0149130 A1* | 5/2017 | Kim | H01Q 21/0056 |
| 2018/0130355 A1* | 5/2018 | Zia | B60W 30/00 |
| 2018/0156607 A1 | 6/2018 | He et al. | |
| 2018/0217229 A1 | 8/2018 | Shukla et al. | |
| 2019/0260455 A1* | 8/2019 | Ryu | G06K 9/00664 |
| 2020/0118313 A1* | 4/2020 | Phogat | G06F 17/16 |
| 2020/0137580 A1* | 4/2020 | Yang | H04W 4/40 |
| 2020/0278693 A1* | 9/2020 | Vijaya Kumar | G06K 9/00201 |
| 2020/0327343 A1* | 10/2020 | Lund | G06T 7/70 |
| 2021/0229696 A1* | 7/2021 | Zhang | G08G 1/165 |

OTHER PUBLICATIONS

Stork, David G. et al., Lensless Ultra-Miniature CMOS Computational Imagers and Sensors, Computational Sensing and Imaging, Rambus Labs, Sunnyvale, CA.

* cited by examiner

SMART MMWAVE C-V2X ANTENNA

TECHNICAL FIELD

Aspects of the disclosure generally relate to use of a smart millimeter wave (mmWave) cellular-vehicle-to-anything (C-V2X) antennas for communication between vehicles.

BACKGROUND

Directional smart antennas (typically phased array) can beam point-2-point mmWave data communication signals between vehicles (either C-V2X or V2X). These links can support a physical mesh network that supports multiple virtual networks. The mmWave data links may operate in the IEEE Ka band or V band that spans 26.5-75 GHz (wavelength 11.1-4 mm), the same range as vehicle radar for adaptive cruise control. Some standards for V2X communication include SAE J2735—Dedicated Short Range Communications (DSRC) Message Set Dictionary; IEEE 1609—WAVE Simple Message Protocol (frame format of wireless vehicle-2-vehicle communication protocol) (WAVE—Wireless Access in Vehicular Environments); and J2735 and IEEE 1609 ad-hoc V2V communication omni-directional radiators/antennae. These standards can also be used for directional mmWave communication between vehicles.

Directing a beam between paired smart antennas to locate their counterparts on the opposite vehicle may be referred to as training. This training, as well as continued tracking of the antenna counterparts as vehicles move relative to each other (or the beam is interrupted by obstructions) requires substantial processing power. This increases the overall expense and difficulty of implementation of mmWave antenna communication.

In addition to aiming the beam, it is also necessary to correct for Doppler shift that is the result of changing beam length as the vehicles move relative to each other. This is a minor consideration at lower frequencies but a significant issue in the Ka and V bands.

SUMMARY

In one or more illustrative examples, a vehicle includes a millimeter wave (mmWave) antenna, including a millimeter wave (mmWave) antenna, including a plurality of light elements and a plurality of active antenna elements in a predefined configuration surrounding a lensless camera element. The vehicle further includes an antenna controller configured to receive an image of a second mmWave antenna of a second vehicle via the lensless camera of the mmWave antenna, identify a scale and angle of rotation between the mmWave antenna and the second mmWave antenna based on the image, compute phase angles for the active antenna elements of the mmWave antenna according to the scale and angle of rotation, and transmit data using the active antenna elements to the second vehicle, according to the computed phase angles, to form a beam targeted at the second mmWave antenna of the second vehicle.

In one or more illustrate examples, a method includes receiving an image, from a millimeter wave (mmWave) antenna including a plurality of light elements and active antenna elements in a predefined configuration surrounding a lensless camera element, of a second mmWave antenna of a second vehicle via the lensless camera of the mmWave antenna; identifying a scale and angle of rotation between the mmWave antenna and the second mmWave antenna based on the image; computing phase angles for the active antenna elements of the mmWave antenna according to the scale and angle of rotation; and transmitting data using the active antenna elements to the second vehicle, according to the computed phase angles, to form a beam targeted at the second mmWave antenna of the second vehicle.

In one or more illustrative examples, a system for vehicle includes a millimeter wave (mmWave) antenna, including a plurality of light elements and active antenna elements in a predefined configuration surrounding a lensless camera element; an ad-hoc communication antenna configured to operate utilizing a radial radiation pattern to provide data transmission, wherein the antenna controller is further configured to receive, via the ad-hoc communication antenna, information related to a relative position of the vehicle to the second vehicle; and an antenna controller configured to receive an image of a second mmWave antenna of a second vehicle via the lensless camera of the mmWave antenna, utilize a Fourier transform to estimate translation, rotation, and scaling between the image and a predefined image included in a library of shapes, by applying a discrete Fourier transform (DFT) matrix to the image, the DFT matrix being generated according to a mathematical representation of the plurality of light elements of the mmWave antenna, identify a scale and angle of rotation between the mmWave antenna and the second mmWave antenna based on the image, compute phase angles for the active antenna elements of the mmWave antenna according to the scale and angle of rotation by utilize a Kalman filter, and transmit data using the active antenna elements to the second vehicle, according to the computed phase angles, to form a beam targeted at the second mmWave antenna of the second vehicle.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Vehicles may travel in a formation along a roadway and may be interconnected by mmWave antenna beams. By measuring antenna angle and the length of the beams between mmWave antennas connecting the vehicles, it is possible to determine a relative position of the vehicles in the formation. This may be accomplished using a cooperative positioning algorithm rooted in triangulation network algorithms, such as those used for surveying. Relative position of the vehicles is a useful input for advanced driver assistance features, such as blind spot monitoring, and can potentially replace expensive sensors.

Figure 1:
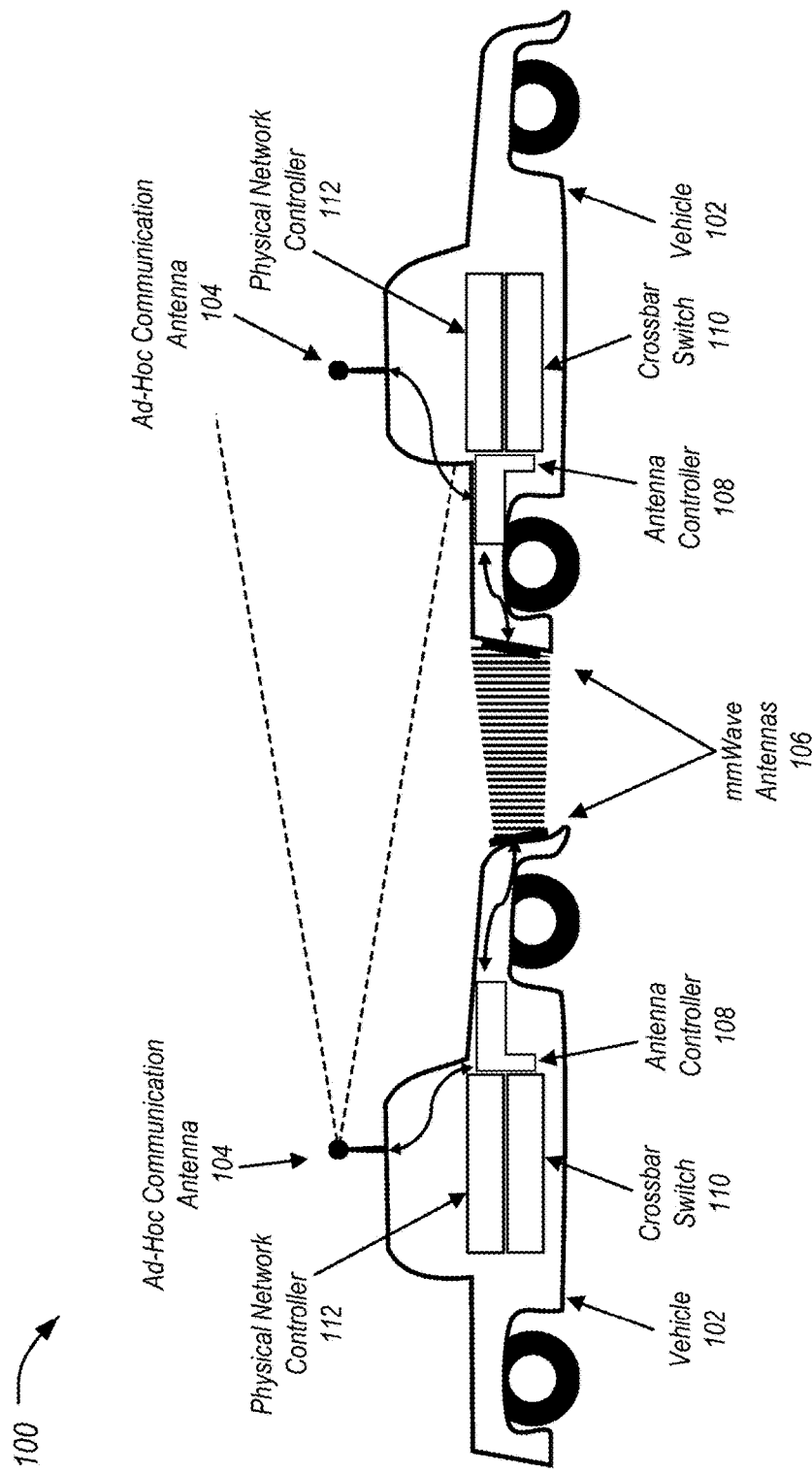
FIG. 1 illustrates an example system for data communication between vehicles.

FIG. 1 illustrates an example system 100 for data communication between vehicles 102. As shown, a first vehicle 102A and a second vehicle 102B (collectively 102) each have mmWave antennas 104 and ad-hoc communication antennas 106. The mmWave antennas 104 and ad-hoc communication antennas 106 may be controlled by antenna controllers 108 of the vehicles 102. Each vehicle 102 may also include a crossbar switch 110 and a physical network management controller 112 to manage control of the communications.

The vehicle 102 may include various types of automobile, crossover utility vehicle (CUV), sport utility vehicle (SUV), truck, recreational vehicle (RV), boat, plane or other mobile machine for transporting people or goods. In many cases, the vehicle 102 may be powered by an internal combustion engine. As another possibility, the vehicle 102 may be a battery-electric vehicle (BEV) powered one or more electric motors, a hybrid electric vehicle (HEV) powered by both an internal combustion engine and one or more electric motors, such as a series hybrid electric vehicle (SHEV), a parallel hybrid electrical vehicle (PHEV), or a parallel/series hybrid electric vehicle (PSHEV). As the type and configuration of vehicle 102 may vary, the capabilities of the vehicle 102 may correspondingly vary. As some other possibilities, vehicles 102 may have different capabilities with respect to passenger capacity, towing ability and capacity, and storage volume.

The ad-hoc communication antennas 104 may be configured to support communication with a wide radiation pattern as compared to that of the mmWave antennas 106. In an example, the ad-hoc communication antennas 104 may be a monopole or ground plane antennas mounted vertically to a roof of the vehicle 102 to provide a radiation pattern around the vehicle 102. The ad-hoc communication antennas 104 may therefore operate utilizing a radial radiation pattern. These antennas may operate in the C-X band in an example, where data rates may be less than 100 mbs but the signal is able to pass around obstacles due to the wavelength used.

The mmWave antennas 106 may be configured to support communication with a narrow radiation pattern as compared to that of the ad-hoc communication antennas 104. In an example, the mmWave antennas 106 may provide a rectangular mmWave beam operating in the $K_a$-V bands, with supports for data rates of ~5 gbs. Notably, such radiation is very line-of-sight (LOS) and may not penetrate many obstacles. At this wavelength, omni-directional transmission as with the ad-hoc communication antennas 104 may be infeasible due to much larger Doppler multipath fading. Typically, when the beam from the mmWave antennas 106 is interrupted by an obstruction, the ad-hoc antennas 104 may continue to provide a communications channel.

The antenna controllers 108 may be configured to manage operation of the ad-hoc communication antennas 104 and mmWave antennas 106. In an example, the antenna controllers 108 manage the connections of the ad-hoc communication antennas 104 to other vehicles 102. In another example, the antenna controllers 108 manages the beamforming or other aspects of the communication of the mmWave antennas 106 to other vehicles 102.

The crossbar switch 110 may be coupled to the mmWave antennas 106 arranged around the vehicle 102, and may be configured to wirelessly connect and communicate with mmWave antennas 106 of other adjacent traveling vehicles 102. Under the control of the physical network management controller 112, the crossbar switch 110 of the vehicles 102 in the formation may be configured to form one or more networks including the vehicles 102 of the formation through these connections. In one example, the physical layer modulation utilized by the mmWAve antennas 106 may be Orthogonal Frequency Domain Multiplexing (OFDM), which may be used in both IEEE 802.11p or ITU 5G physical layers, although different physical layers may be used.

In addition to the physical network management controller 112, the vehicle 102 may also include a plurality of controllers configured to perform and manage various vehicle 102 functions under the power of the vehicle battery and/or drivetrain. The controller 112 (and also the other controllers) may each include one or more processors configured to execute computer instructions, and a storage medium on which the computer-executable instructions and/or data may be maintained. A computer-readable storage medium (also referred to as a processor-readable medium or storage) includes any non-transitory (e.g., tangible) medium that participates in providing data (e.g., instructions) that may be read by a computer (e.g., by the processor(s)). In general, the processor receives instructions and/or data, e.g., from the storage, etc., to a memory and executes the instructions using the data, thereby performing one or more processes, including one or more of the processes described herein. Computer-executable instructions may be compiled or interpreted from computer programs created using a variety of programming languages and/or technologies, including, without limitation, and either alone or in combination, JAVA, C, C++, C#, FORTRAN, PASCAL, VISUAL BASIC, PYTHON, JAVA SCRIPT, PERL, PL/SQL, etc. It should be noted that the controllers discussed herein may be described as discrete controllers. However, the vehicle controllers may share physical hardware, firmware, and/or software, such that the functionality of multiple controllers may be integrated into a single controller, and that the functionality of various such controllers may be distributed across a plurality of controllers. Also not shown, a vehicle bus may include various methods of communication available between the vehicle controllers. As some non-limiting examples, the vehicle bus may include one or more of a vehicle controller area network (CAN), an Ethernet network, or a media-oriented system transfer (MOST) network.

Figure 2:
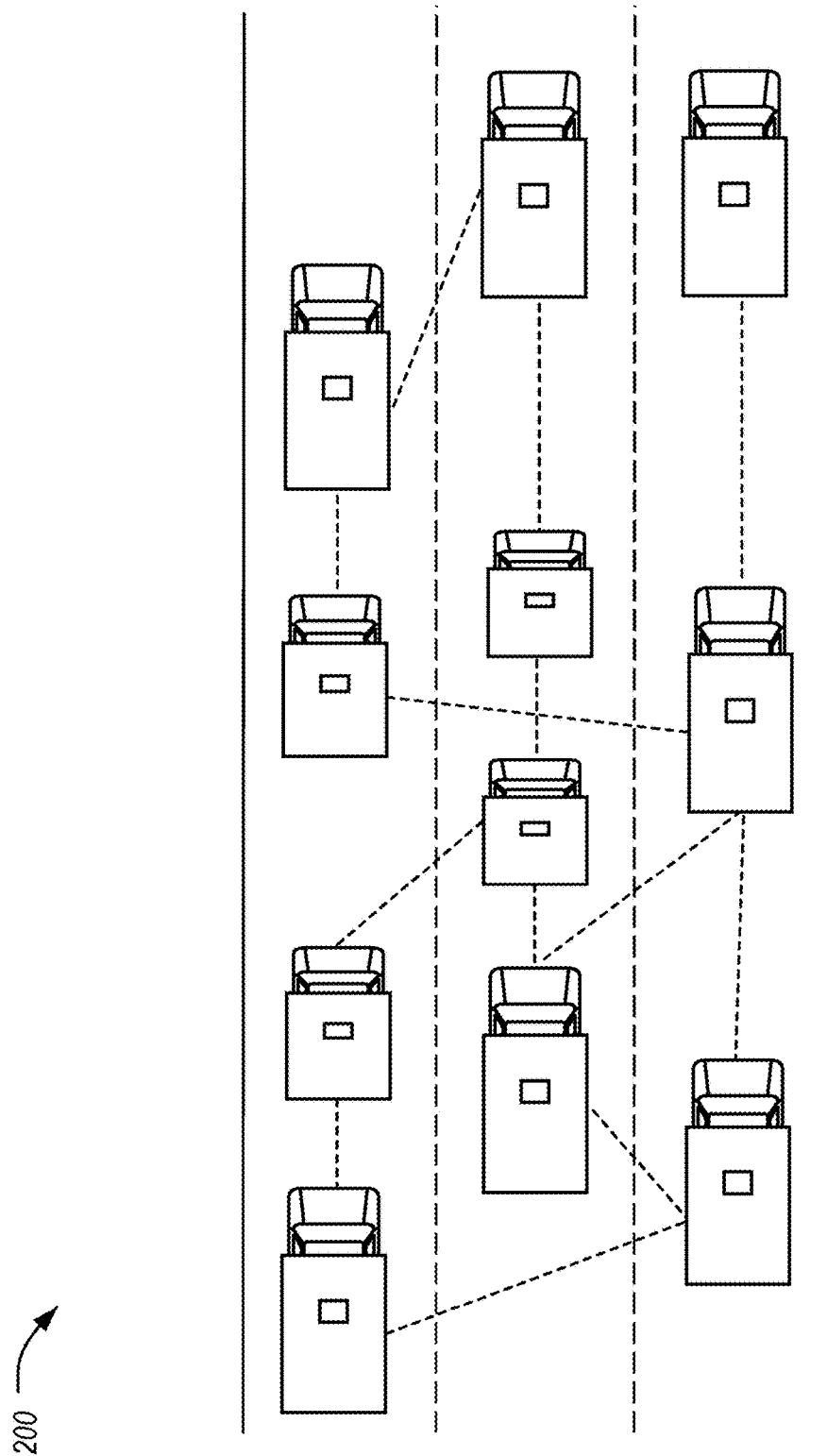
FIG. 2 illustrates an example of a formation of vehicles along a roadway.

FIG. 2 illustrates an example 200 of a formation of vehicles 102 along a roadway 202. As shown, the vehicles 102 may be connected to neighboring vehicles 102 in a mesh network configuration using the mmWave antennas 106. Each of the vehicle-to-vehicle (V2V) connections is illustrated in the diagram as a dashed line. Additionally, each of the vehicles 102 may be connected to each other vehicle in the formation by communication via the ad-hoc communication antennas 104.

Figure 3:
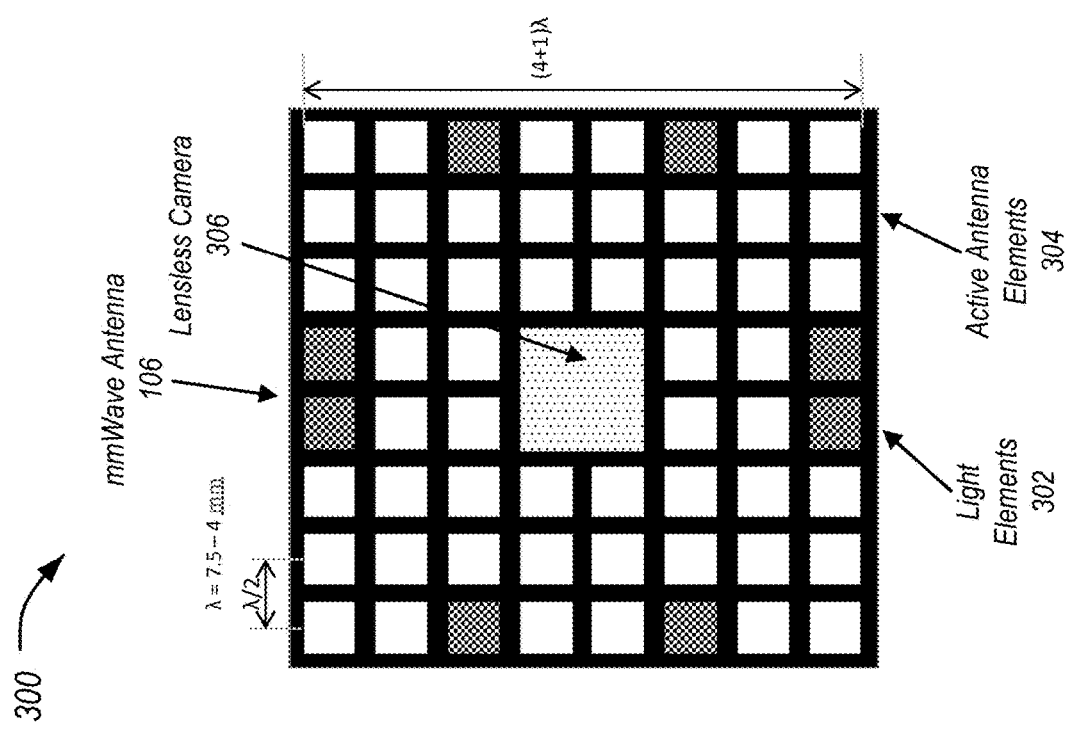
FIG. 3 illustrates further details of an example of a mmWave antenna.

FIG. 3 illustrates further details of an example 300 of a mmWave antenna 106. As shown, the mmWave antenna 106 includes a plurality of lights elements 302 arranged in an array of active antenna elements 304, where the lights elements 302 and active array elements 304 surround a lensless camera element 306. In an example, the distance between centers of the active antenna elements 304 and the lights elements 302 may be defined to be $\lambda/2$. In one example, $\lambda$ may be defined as being within the range of approximately 7.5 mm to 4 mm. In one example, the size of the array may be defined as $(4+1) \lambda$, with six lights elements 302. The mmWave antenna 106 accordingly functions as a multi-element antenna phased array antenna, where the normal spacing between elements is wavelength (lambda)/2 for a good balance between directional performance and inter-element interference.

In an example, the light elements 302 may be light emitting diode (LED) lights. With respect to the wavelength of light being used, there may be advantages to choosing longer wavelengths such as infrared. For instance, long wavelength may have lower attenuation in foggy conditions. In other examples, light in the visible spectrum may be used. As another consideration apart from environmental factors, the type of electronics being used may affect the choice of frequency. For instance, silica has a limited spectra that is somewhat beyond the visible range, including near ultraviolet and near infrared.

The active array elements 304 may each include an antenna element, a conductor on top of an insulator, with a surface layer exposed to atmosphere. Below that, active array elements 304 may include electronics such as CMOS that implement a heterodyne circuit that mixes the carrier frequency with a modulated frequency and separates out the frequency to be transmitted. When the signals are mixed, a difference of the two wavelengths is produced. A phase of the carrier may be controlled as each antenna may carry a different phase, The active array elements 204 may further include additional control circuitry, such as phase delay circuits to allow for beam correction as some elements are more out of phase than others. For transmission, each active array elements 304 has a radiator (conductor over insulator) with a hemispherical radiation pattern. Below the radiator may be a circuit that modulates the base-band signal from the crossbar switch 110 with the output of a local oscillator. The local oscillators for each element may be synchronized, but a phase shifter introduces a delay between each element and its neighbors. Proper control of the element phases ensures that the superposition of the radiated signal forms a focused beam directed towards a target. For receiving, each radiator is used as an antenna. Correct control of the phase shifters ensures that the antenna only receives coherent signals from sources within a beam. In many examples, the antenna elements are half-duplex, but the antenna may include some antennae receivers and other transmitters as full duplex for communication over the entire smart antenna. Some beam focusing may be sacrificed as fewer elements are used in each direction.

Regarding the lensless camera elements 306, a lensless camera uses a diffraction grating, over the photodetection element itself. The photodetection element is broken down into pixels as in an ordinary camera, but in this they may be referred to as superpixels, where within the superpixel there are different amounts of light captured depending on the angle. Lensless camera implements the Talbot effect with diffraction gratings to affect angle-sensitive super-pixels. Because signals from the super-pixels has intensity vs. angle information the 2D Fourier transform is available by sorting the signals correctly. Looking straight ahead, super pixel elements that are in the center correspond to light coming straight ahead, elements on the right correspond to light coming in on an angle to the right, and elements on the left correspond to light coming in on an angle to the left. The result is that a Fourier transform of the image is generated. So to render something that is recognizable an inverse Fourier transform of the output is used to get an image of whatever is being imaged. Moreover, the lensless camera element 306 may be used to locate the image. It may be easier to locate the image with a Fourier transform than to convert to an image and then locate the image. This may be accomplished by correlating the Fourier transform of the image with predefined patterns. From the Fourier transform, an angle may be identified. A correlation may be performed, and bright areas may be identified where the predefined pattern matches one place on the image. Where there a match between the Fourier transform of the captured image and the Fourier transform of the pattern, a distance of that spot from the origin tells you a vector that you can use to identify the phase angle. Scale may additionally be adjusted to obtain more precise measurements. Lensless cameras may be superior in this application because they are small and require no moving parts or bulky lens. The lensless camera is ~1000th the volume of a conventional camera. Focusing is instantaneous and depth of field is virtually infinite.

The mmWave antenna 106 (including lensless camera elements 306, active array elements 304 and light elements 302) may be manufactured as thin, flat, and flexible to conform with the shape of vehicle 102 body panels. The crossbar switch 110 may connects multiple mmWave antennae 106 distributed around the vehicle 102 such that messages received at one mmWave antenna 106 may be routed through the crossbar switch 110 and transmitted from another mmWave antenna 106, in most cases bypassing a vehicle's internal network (CAN or Ethernet).

Figure 4:
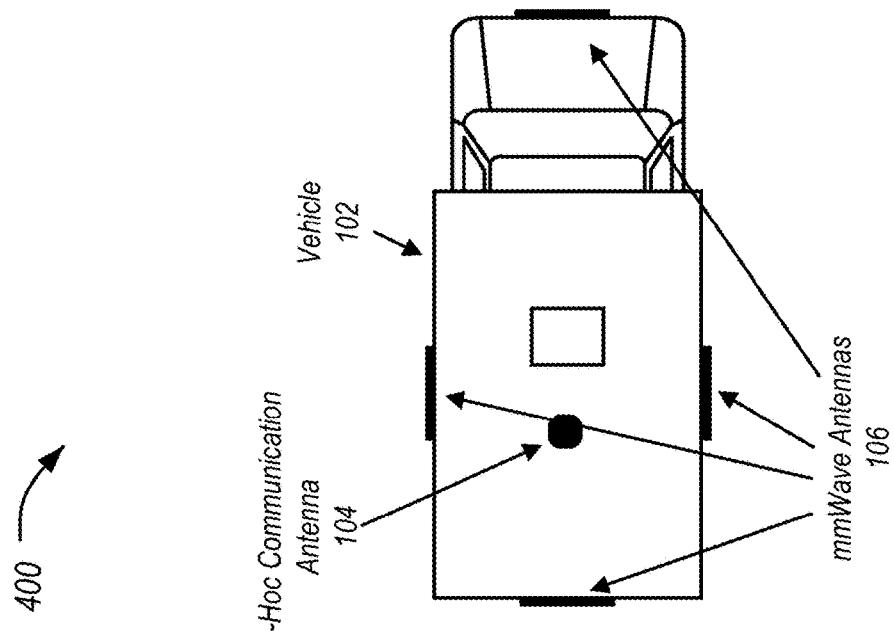
FIG. 4 illustrates an example configuration of mmWave antennas on a vehicle.

FIG. 4 illustrates an example 400 configuration of mmWave antennas 106 on a vehicle 102. As shown, the vehicle 102 includes an ad-hoc communication antenna 104 mounted to the roof of the vehicle 102. Additionally, mmWave antennas 106 are mounted on the front, back, driver side, and passenger side of the vehicle 102. It should be noted that this is one example use case, and in another example, the smart antennae similar to mmWave antennas 106 may be installed to infrastructure, such as signal lights or signage, and coupled to the vehicle 102 mmWave antennas 106 for V2I communications.

Figure 5:
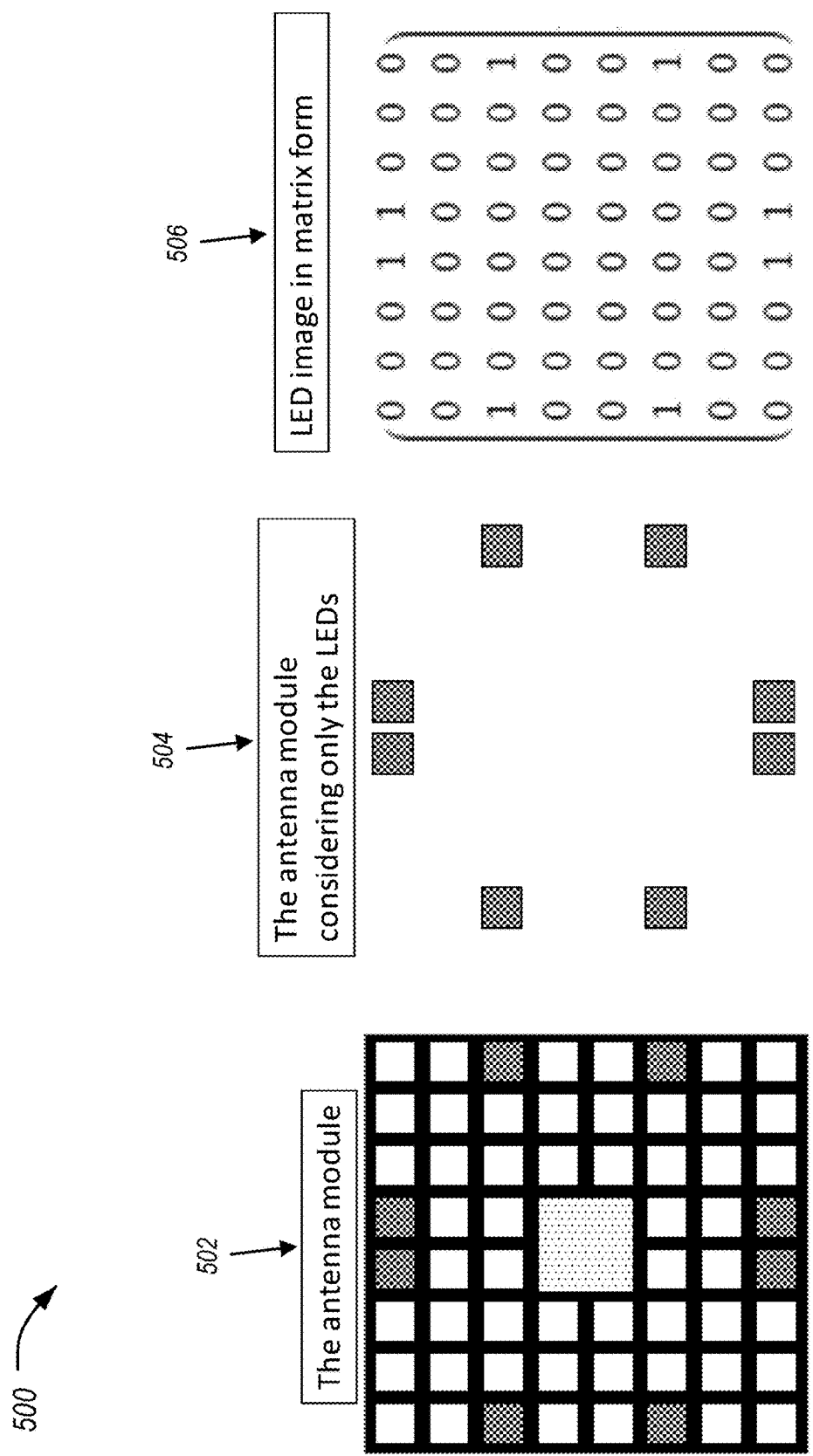
FIG. 5 illustrates an example mathematical representation of the light elements of the mmWave antenna.

FIG. 5 illustrates an example mathematical representation of the light elements 302 of the mmWave antenna 106. As shown at 502, the mmWave antenna 106 includes multiple light elements 302. As shown at 504, only the light elements 302 are illustrated to east of explanation. At 506, the locations at which the light elements 302 are located within the mmWave antenna 106 are represented in matrix form. For instance, the mmWave antenna 106 may be represented as an array of eight by eight elements, which corresponds to the size of the mmWave antenna 106 array of light elements 302, active antenna elements 304, and lensless camera 306 elements. Each of the locations of the array that is a light element 302 may be represented by a first value (e.g., one), while each of the locations of the array that is not a light element 302 may be represented by a second value (e.g., zero). It should be noted that this specific layout of the mmWave antenna 106 is but one example, and other layouts of light elements 302, active antenna elements 304, and lensless camera 306 elements may be used.

A discrete Fourier transform (DFT) matrix may be generated based on the representation at 506. The DFT matrix may be an expression of a discrete Fourier transform as a transformation matrix, which can be applied to a signal through matrix multiplication. Continuing the example from the representation at 506, such a matrix may be as follows:

| 1 + 0 i | 0 i | 0.5-0.5 i | 0 i | 0 i | 0 i | 0.5 + 0.5 i | 0 i |
|---|---|---|---|---|---|---|---|
| 0.25−0.103553 i | −0.426777 + 0.426777 i | 0.0732233-0.176777 i | 1.38778 × 10^-17 + 0.25 i | 0 i | −0.176777-0.176777 i | 0.176777 + 0.00732233 i | −0.603553-5.55112 × 10^-17 i |
| 0 i | −0.25 + 0.603553 i | 0 i | 0.103553 + 0.25 i | 0 i | −0.25-0.103553 i | 0 i | −0.603553 + 0.25 i |
| 0.25−0.603553 i | −1.38778 × 10^-17-0.25 i | −0.176777-0.426777 i | −0.0732233-0.0732233 i | 0 i | 0.103553 + 2.77556 × 10^-17 i | 0.426777-0.176777 i | 0.176777-0.176777 i |
| 0 i | 0 i | 0 i | 0 i | 0 i | 0 i | 0 i | 0 i |
| 0.25 + 0.603553 i | 0.176777 + 0.176777 i | 0.426777 + 0.176777 i | 0.103553-2.77556 × 10^-17 i | 0 i | −0.0732233 + 0.0732233 i | −0.176777 + 0.426777 i | −1.38778 × 10^-17 + 0.25 i |
| 0 i | −0.603553-0.25 i | 0 i | −0.25 + 0.103553 i | 0 i | 0.103553-0.25 i | 0 i | −0.25-0.603553 i |
| 0.25 + 0.103553 i | −0.603553 + 5.55112 × 10^-17 i | 0.176777-0.0732233 i | −0.176777 + 0.176777 i | 0 i | 1.38778 × 10^-17-0.25 i | 0.0732233 + 0.176777 i | −0.426777-0.426777 i) |

Figure 6:
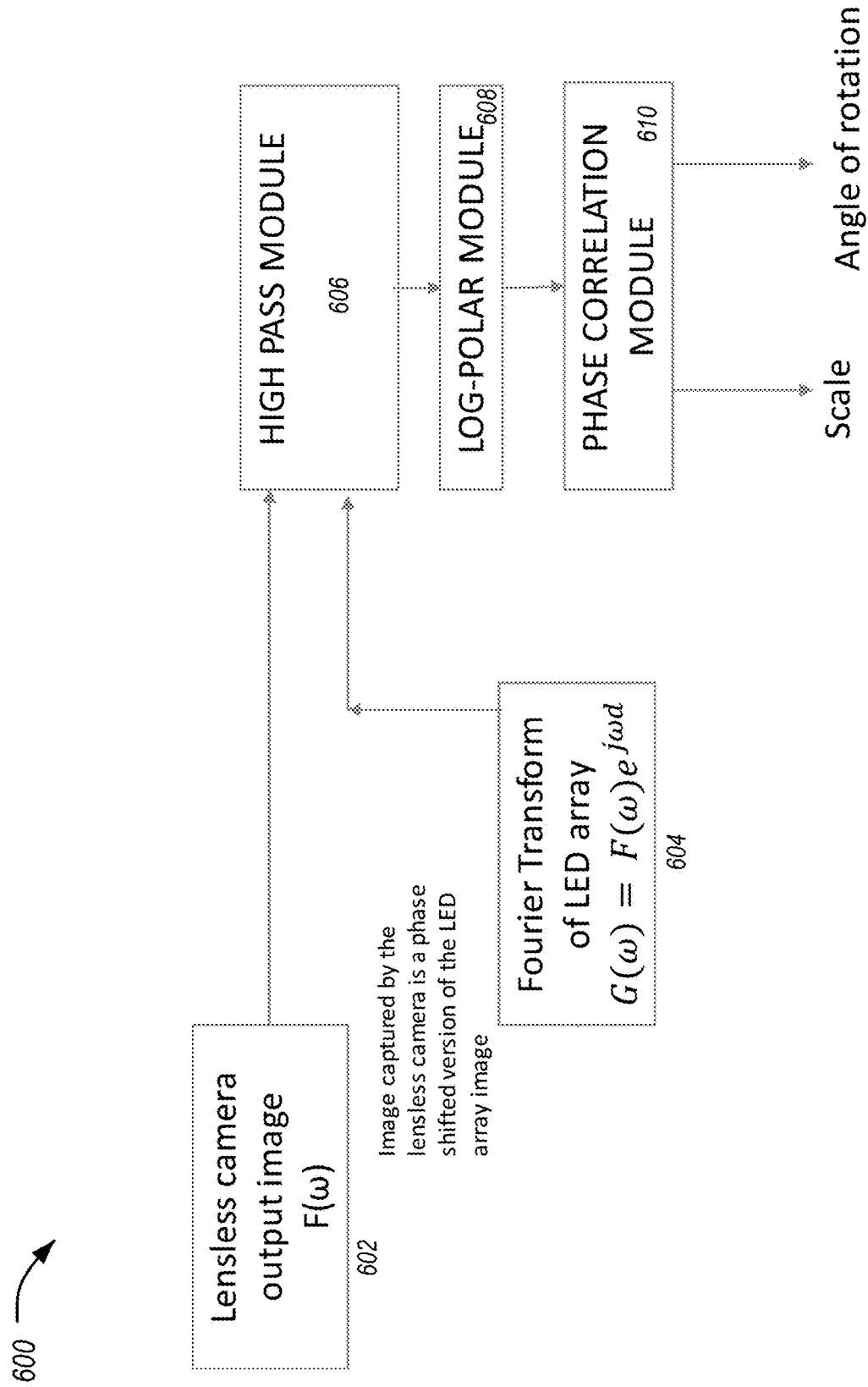
FIG. 6 illustrates an example data flow for determination of scale and angle of rotation information between two mmWave antennas.

FIG. 6 illustrates an example data flow 600 for determination of scale and angle of rotation information between two mmWave antennas 106. For example, the scale and angle of rotation may be determined for mmWave transmission between a mmWave antenna 106 of a first vehicle 102 and a mmWave antenna 106 of a second vehicle 102.

A 2-D Fourier transform may be used to estimate the translation, rotation and scaling between two given images. This may be accomplished using the phase correlation method, which is sometimes referred to as a Phase-Only Matched Filter (POMF). By relying on the shift property of the 2-D Fourier transform, the phase correlation method computes the cross-power spectrum of two images and searches for the location of a peak in its Fourier inverse, which is the position of the peak corresponds to the translation vector between the two images. By using a log-polar representation, the phase correlation method can be easily extended to estimate the rotation angle and scaling between a pair of images. The results hold for finite images taken from a continuous scene, even when the overlap between the images is small or when a substantial amount of noise is present.

As shown at 602, the lensless camera 306 of the mmWave antenna 106 of the first vehicle 102 captures an image, which may be referred to as F(w). The image captured by the lensless camera 306 of the mmWave antenna 106 of the first vehicle 102 may be a phase-shifted version of the light output provided by the light elements 302 of the mmWave antenna 106 of the second vehicle 102.

At 604, based on data received from the lensless camera element 306 of the mmWave antenna 106 a Fourier transform of the captured image F(w) may be performed. For instance, the transform may be performed using a DFT matrix of the representation of the light elements 302 as discussed above. An output G(w) may be determined as $F(w)e^{jwd}$, where F(w) is a delayed version of the image G(w). The Fourier transform of the light pattern G(w) may be stored in a library of shapes. The image captured by the lensless camera element 306 may be a translated and rotated version of the original pattern. The output of the lensless camera element 306 is the Fourier Transform of the image F(w). So we can represent G(w) as a delayed version of F(w) in frequency spectrum.

At 606, the output at 604 and the image at 602 are applied to a high pass module. At 608, the output of the high pass module is applied to a log-polar module. At 610, the output of the log polar module is applied to a phase-correction module. The result of these operations is the scale and angle of rotation between the mmWave antenna 106 of the first vehicle 102 and the mmWave antenna 106 of the second vehicle 102. Further aspects of the computation of scale and angle of rotation are discussed in detail in "An FFT-Based Technique for Translation, Rotation, and Scale-Invariant Image Registration" B. Srinivasa Reddy and B. N. Chatterji. IEEE TRANSACTIONS ON IMAGE PROCESSING, VOL. 5, NO. 8, AUGUST 1996, which is incorporated herein by reference in its entirety.

Figure 7:
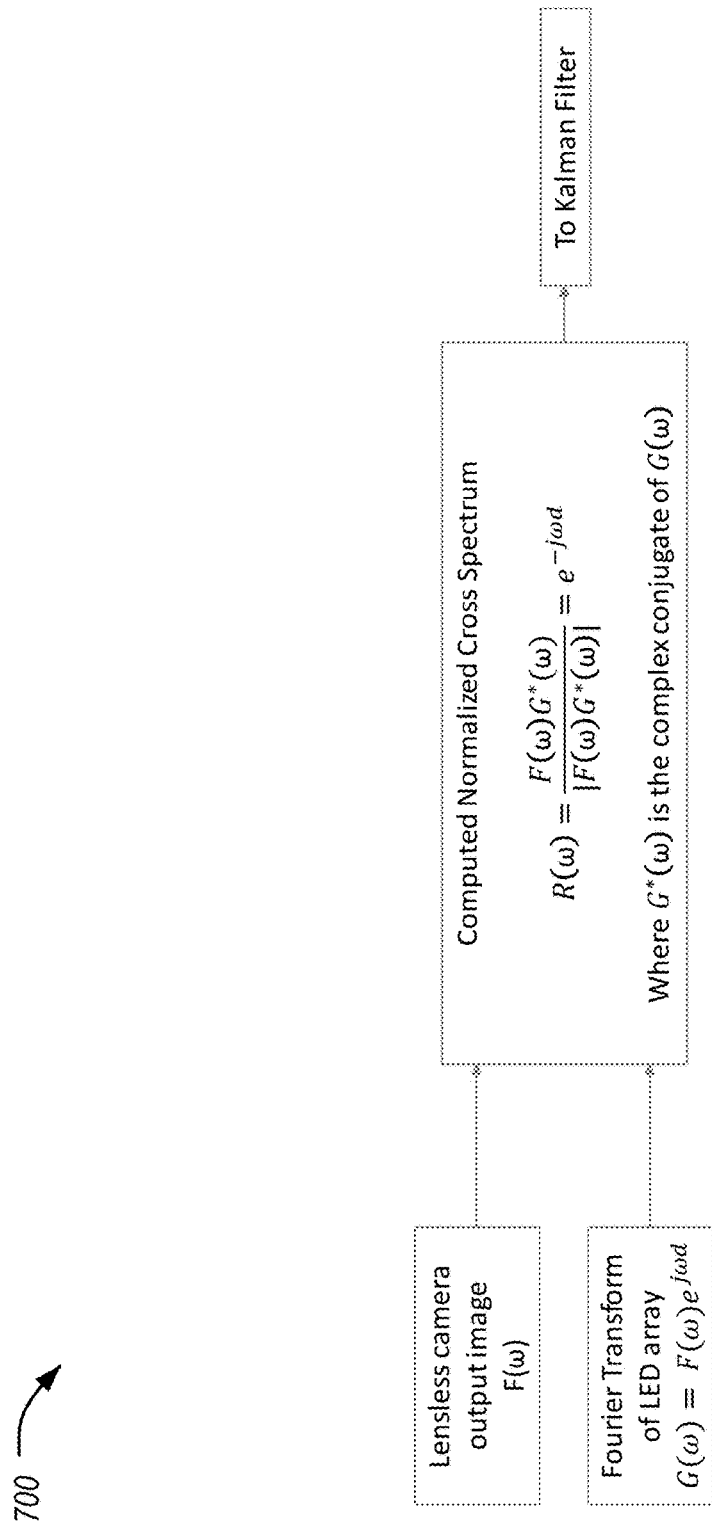
FIG. 7 illustrates an example of additional details of the phase correlation of the data flow of FIG. 6.

FIG. 7 illustrates an example 700 of additional details of the phase correlation of the data flow of FIG. 6. As shown, the input to the phase-correction module includes the Fourier Transform of two images G1 and G2, which have same dimensions (N×N). The phase difference matrix may be derived by forming the cross-power spectrum G1G2* and dividing by its modulus. The phase correlation function, d, is then obtained as a real N×N element array by taking the inverse Fourier transform of the phase difference array. This may be accomplished by taking advantage of the shift property of Fourier transforms. By relying on the shift property of the 2-D Fourier transform, the phase correlation method computes a cross-power spectrum of two images and searches for the location of a peak in its Fourier inverse: the position of the peak corresponds to the translation vector between the two images.

Figure 8:
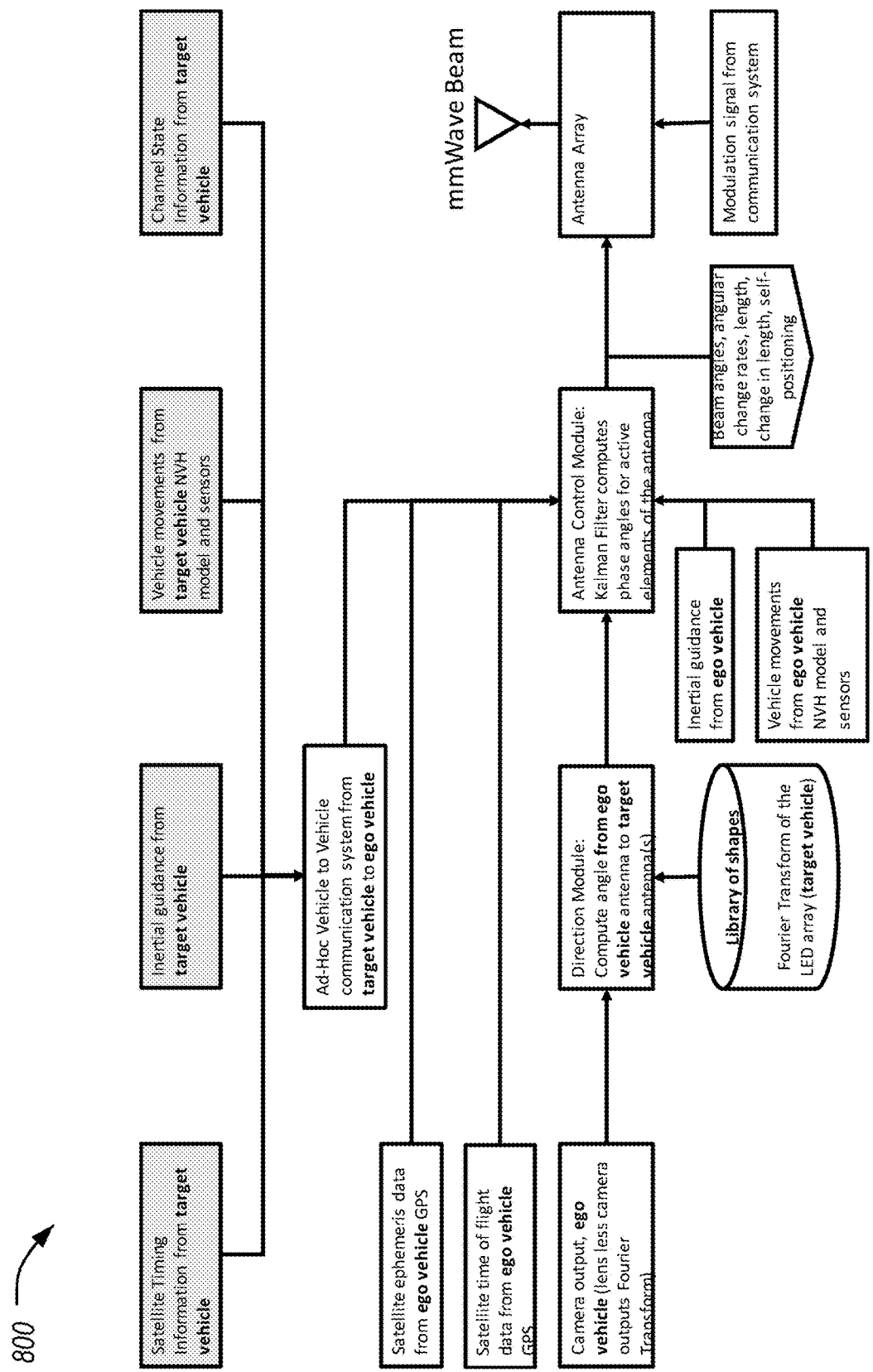
FIG. 8 illustrates an example data flow for computing phase angles of active transmitting antenna elements of a mmWave antenna of an ego vehicle.

FIG. 8 illustrates an example data flow 800 for computing phase angles of active transmitting antenna elements 304 of a mmWave antenna 106 of an ego vehicle 102. The ego vehicle 102 may refer to a first vehicle 102 while the target vehicle 102 may refer to a second vehicle 102 in communication with the first vehicle 102.

The ego vehicle 102 may receive various information regarding the target vehicle 102. This information may be received, for example, via transmission using the ad-hoc communication antennas 104, and may relate to the relative position of the ego vehicle 102 and the target vehicle 102. This information may include, as some examples, satellite timing information from the target vehicle 102, internal guidance from the target vehicle 102, vehicle movements from the target vehicle 102 according to a noise, vibration, and harshness (NVH) model and sensors of the target vehicle 102, and channel state information from the target vehicle 102. The ego vehicle 102 may provide this information to the antenna controller 108 of the ego vehicle 102.

The antenna controller 108 of the ego vehicle 102 may also receive various information regarding the ego vehicle 102. For instance, the antenna controller 108 may receive satellite ephemeris data from a global navigation satellite system (GNSS) controller of the ego vehicle 102. The antenna controller 108 may also receive satellite time-of-flight data from the GNSS controller of the ego vehicle 102. The antenna controller 108 may also receive internal guidance from the ego vehicle 102, vehicle movements from the ego vehicle 102 according to a noise, vibration, and harshness (NVH) model and sensors of the ego vehicle 102.

In addition, the Fourier transformed image from the lensless camera 306 of the mmWave antenna 106 of the ego vehicle 102 may be provided to a direction controller to compute the scale and angle of rotation of the mmWave antenna 106 as compared to a mmWave antenna 106 of the target vehicle 102. The direction controller may utilize a library of shapes that, as mentioned above, includes a set of patterns that result in the capture of the light elements 302 by the lensless camera 306. The library of shapes may include multiple patterns, as the layout of the light elements 302 may vary. The antenna controller 108 may be constantly updating the width and angle to ensure there is communication between vehicles 102. If the beam is too wide, undesirable reflections may result, and would have a Doppler effect that is significant at these frequencies (e.g., Doppler frequency spread fading and multipath delay fading). Further details of this process are discussed above with respect to FIG. 6.

Based on the received information, the antenna controller 108 may utilize a Kalman filter to compute phase angles for the active array elements 304 of the mmWave antenna 106. The resultant data from the antenna controller 108 may include beam angles for the mmWave antenna 106, rates of angular change of the connection between the mmWave antenna 106 of the ego vehicle 102 to the mmWave antenna 106 of the target vehicle 102, length of the communication channel between the mmWave antenna 106 of the ego vehicle 102 to the mmWave antenna 106 of the target vehicle 102, change in length of the communication channel between the mmWave antenna 106 of the ego vehicle 102 to the mmWave antenna 106 of the target vehicle 102, and self-positioning information to aid in the alignment between the mmWave antenna 106 of the ego vehicle 102 to the mmWave antenna 106 of the target vehicle 102. These results may be used to control or steer the mmWave antenna 106. For instance, the antenna controller 108 may control the phase of the light elements 302 to form a beam targeted at the mmWave antenna 106 on the other vehicle 102. A signal may accordingly be modulated using the mmWave antenna 106 for transmission from the ego vehicle 102 to the target vehicle 102.

Figure 9:
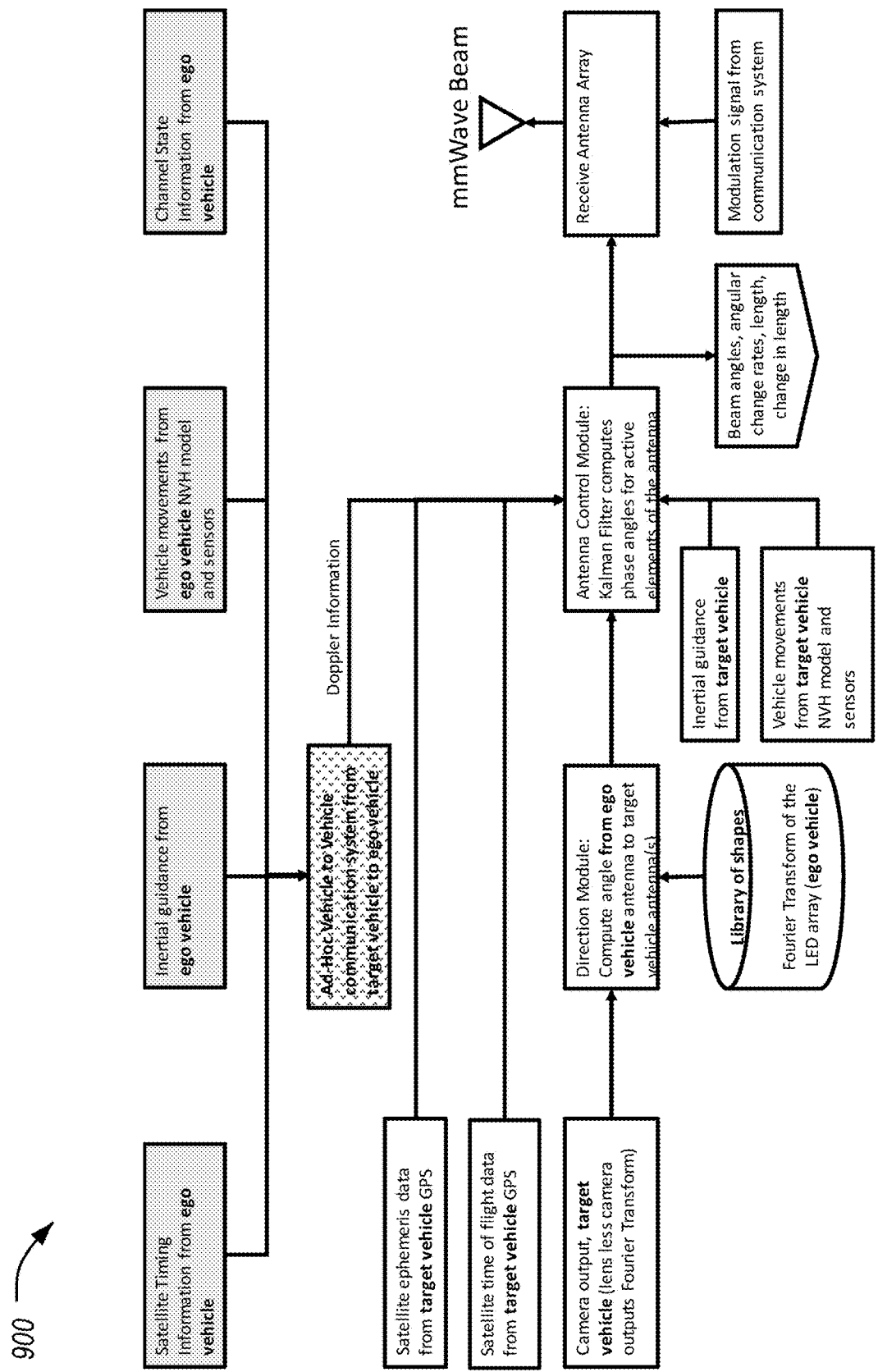
FIG. 9 illustrates an example data flow for computing phase angles of active transmitting antenna elements of a mmWave antenna of a target vehicle.

FIG. 9 illustrates an example data flow 900 for computing phase angles of active transmitting antenna elements 304 of a mmWave antenna 106 of a target vehicle 102. Notably, the data flow 800 is similar to that of the data flow 700, except the roles of the ego vehicle 102 and the target vehicle 102 are reversed. However, an additional option available in the data flow 800 is the receipt of doppler information from the ego vehicle 102 to the target vehicle 102, which is discussed in further detail with respect to FIG. 10.

Figure 10:
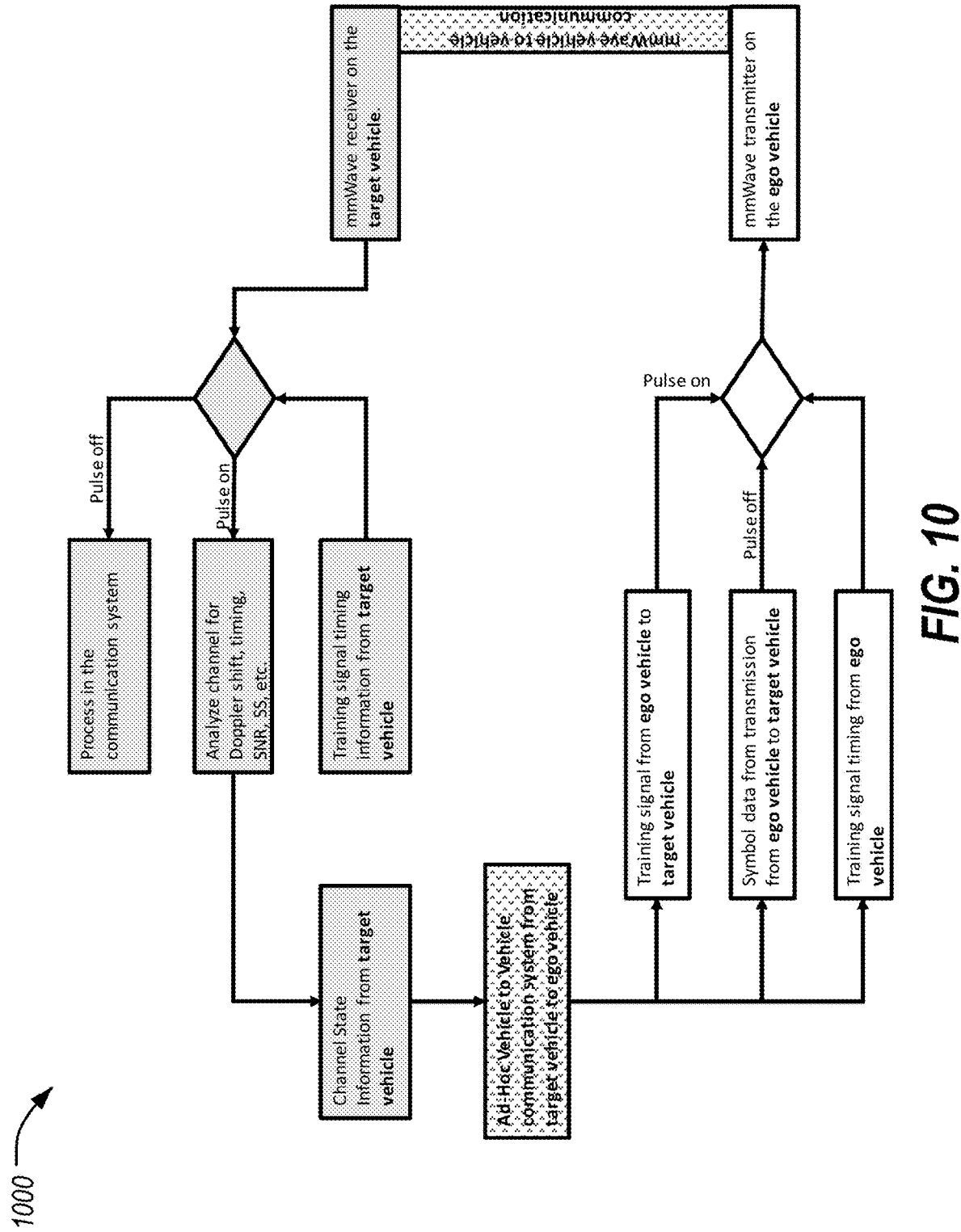
FIG. 10 illustrates an example data flow for training aspects of the mmWave communication channel between the ego vehicle and the target vehicle.

FIG. 10 illustrates an example data flow 1000 for training aspects of the mmWave communication channel between the ego vehicle 102 and the target vehicle 102. As shown, the unshaded elements include operations that are performed by the ego vehicle 102, the solid shaded elements include operations that are performed by the target vehicle 102, and the patterned elements include operations that include both the ego vehicle 102 and the target vehicle 102.

As mentioned, the ego vehicle 102 and the target vehicle 102 may communication using the ad-hoc communication antennas 106. Regarding the ego vehicle 102, a training signal may be sent from the ego vehicle 102 to the target vehicle 102 over this connection. Additionally, symbol data may be sent from the ego vehicle 102 to the target vehicle 102. Yet further, training signal timing may be sent from the ego vehicle 102 to the target vehicle 102.

When a pulse is on, the training signal may be sent to the mmWave antenna 106 of the ego vehicle 102 for transmission to the target vehicle 102. When the pulse is off, the symbol data may be sent to the mmWave antenna 106 of the ego vehicle 102 for transmission to the target vehicle 102. In either case, training signal timing from the ego vehicle 102 is provided to the mmWave antenna 106 of the ego vehicle 102.

The mmWave antenna 106 of the target vehicle 102 may receive the transmission from the ego vehicle 102. If the pulse is off, then the received data is processed by the target vehicle 102 as data communicated from the ego vehicle 102. If the pulse is on, however, the mmWave channel is analyzed for Doppler shift, timing, signal to noise ratio (SNR), SS, etc. Based on the analysis, channel state information may be sent from the target vehicle 102 to the ego vehicle 102 using the ad-hoc communication antennas 106. Whether the data is decoded as a data transmission or to aid in determining the channel state, the decoding of the received data takes into account training signal timing information from the target vehicle 102.

Figure 11:
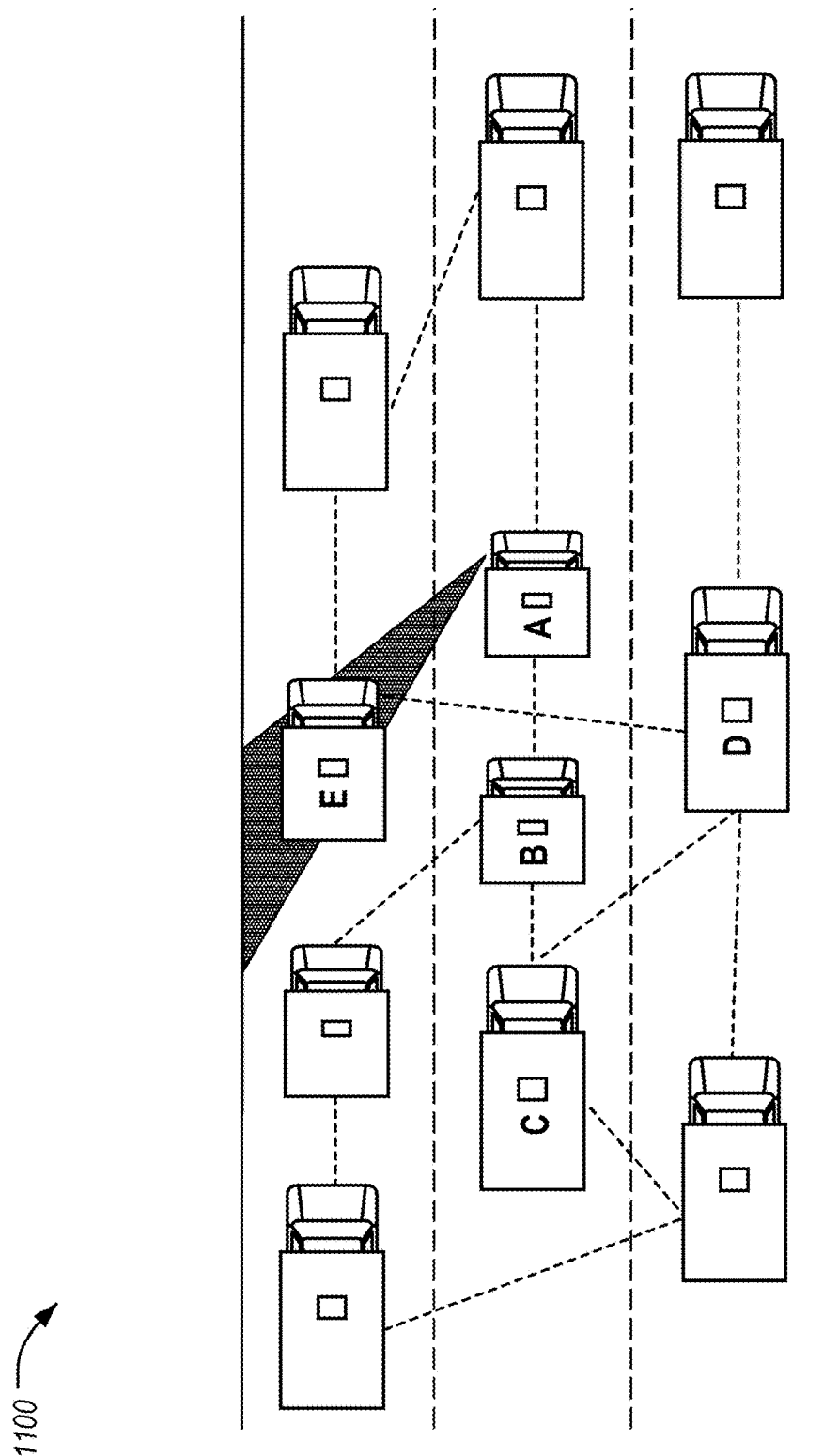
FIG. 11 illustrates an example of a formation of vehicles along a roadway for which relative positions of the vehicles in the formation may be computed.

FIG. 11 illustrates an example 1100 of a formation of vehicles 102 along a roadway for which relative positions of the vehicles 102 in the formation may be computed. As shown, vehicle E is in a blind spot of vehicle A. The angles for the wireless mmWave communications beams, as illustrated in the figure as the lines between the vehicles 102, may be used to compute the relative position of vehicle A and vehicle E.

Figure 12:
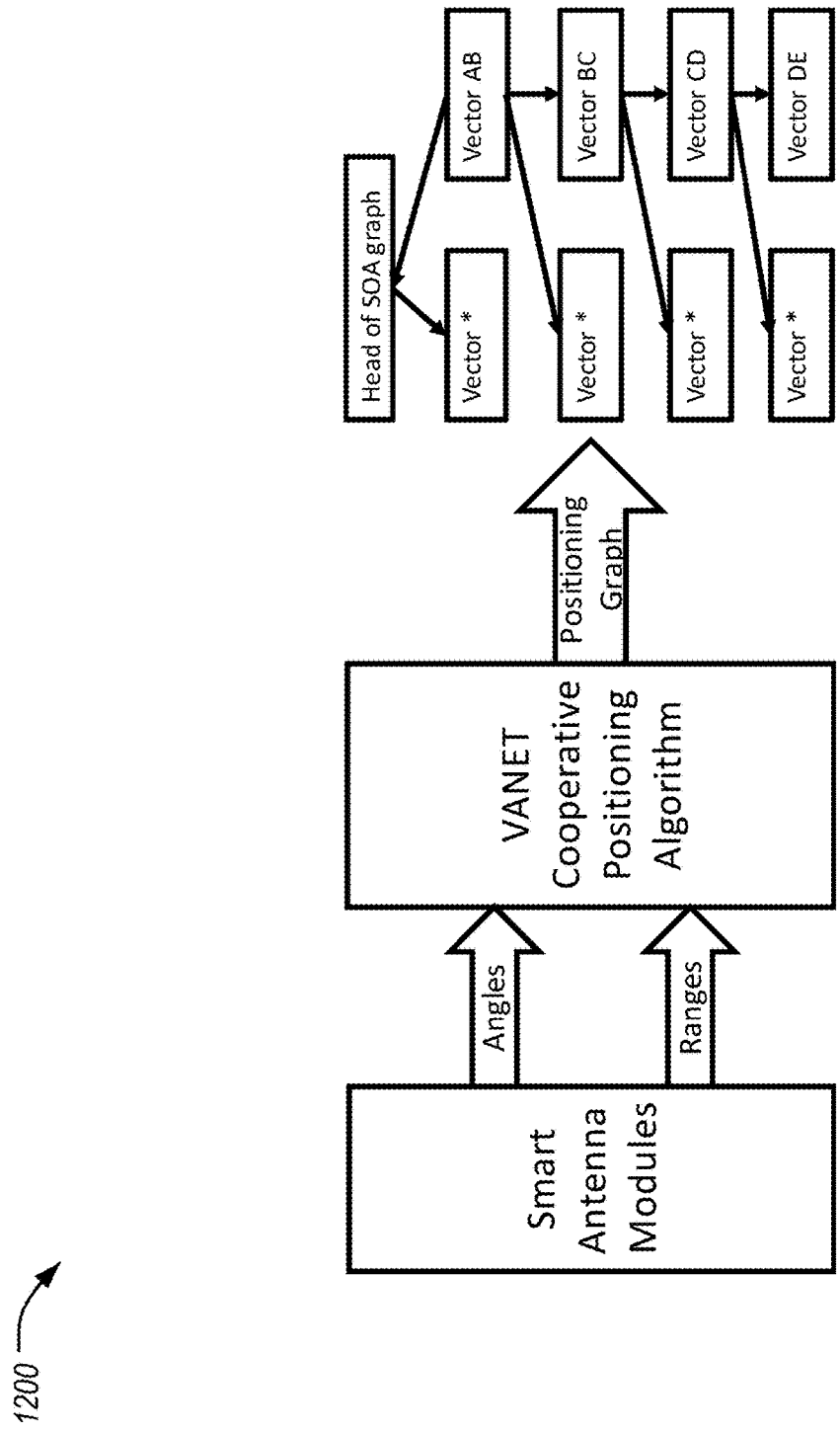
FIG. 12 illustrates an example data flow for the determination of the relative positions of vehicles A and E.

With continuing reference to FIG. 11, FIG. 12 illustrates an example data flow 1200 for the determination of the relative positions of vehicles A and E. A positioning algorithm may utilize the angles and ranges determined for the wireless mmWave communications beams between the vehicles 102 to construct a positioning graph, where the graph may be computed to determine the relative location of the vehicles 102.

For instance, a vector AB between vehicles A and B may be determined from the mmWave link between vehicles A and B, a vector BC between vehicles B and C may be determined from the mmWave link between vehicles B and C, a vector CD between vehicles C and D may be determined from the mmWave link between vehicles C and D, a vector DE between vehicles D and E may be determined from the mmWave link between vehicles D and E. The addition of these vectors may therefore indicate the difference in position between vehicles A and E. With this information, the vehicle A may identify that the vehicle E is within a blind spot of vehicle A, despite vehicle E not being visible to vehicle A.

Computing devices described herein generally include computer-executable instructions where the instructions may be executable by one or more computing devices such as those listed above. Computer-executable instructions may be compiled or interpreted from computer programs created using a variety of programming languages and/or technologies, including, without limitation, and either alone or in combination, JAVA™, C, C++, C#, VISUAL BASIC, JAVASCRIPT, PYTHON, JAVASCRIPT, PERL, PL/SQL, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of computer-readable media.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their broadest reasonable constructions and their ordinary meanings as understood by those knowledgeable in the technologies described herein unless an explicit indication to the contrary in made herein. In particular, use of the singular articles such as "a," "the," "said," etc. should be read to recite one or more of the indicated elements unless a claim recites an explicit limitation to the contrary.

The abstract of the disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle comprising:
    a millimeter wave (mmWave) antenna, including a plurality of light elements and a plurality of active antenna elements in a predefined configuration surrounding a lensless camera element; and
    an antenna controller configured to
        receive an image of a second mmWave antenna of a second vehicle via the lensless camera of the mmWave antenna,
        identify a scale and angle of rotation between the mmWave antenna and the second mmWave antenna based on the image, including to utilize a Fourier transform to estimate translation, rotation, and scaling between the image and a predefined image included in a library of shapes by applying a discrete Fourier transform (DFT) matrix to the image, the DFT matrix being generated according to a mathematical representation of the plurality of light elements of the mmWave antenna, the library of shapes including images representing different layouts of the plurality of light elements for different layouts of mmWave antenna, the predefined image illustrating a pattern that corresponds to a layout of the plurality of light elements of the second mmWave antenna,
        compute phase angles for the active antenna elements of the mmWave antenna according to the scale and angle of rotation, and
        transmit data using the active antenna elements to the second vehicle, according to the computed phase angles, to form a beam targeted at the second mmWave antenna of the second vehicle.

2. The vehicle of claim 1, wherein the antenna controller is further configured to utilize a Kalman filter to compute the phase angles for the active antenna elements.

3. The vehicle of claim 1, further comprising an ad-hoc communication antenna configured to operate utilizing a radial radiation pattern to provide data transmission, wherein the antenna controller is further configured to receive, via the ad-hoc communication antenna, information related to a relative position of the vehicle to the second vehicle.

4. The vehicle of claim 1, wherein the antenna controller is further configured to
    determine, according to the scale and angle of rotation, a first vector of a relative location of the vehicle to the second vehicle,
    receive, from the second vehicle, a second vector of a relative location of the second vehicle to a third vehicle,
    determine a relative location of the vehicle to the third vehicle according to the first vector and the second vector, and
    identify whether the third vehicle is in a blind spot of the vehicle according to the relative location of the vehicle to the third vehicle.

5. The vehicle of claim 4, wherein the antenna controller is further configured to
    receive, from the second vehicle, a third vector of a relative location of the third vehicle to a fourth vehicle,
    determine a relative location of the vehicle to the fourth vehicle according to the first vector, the second vector, and the third vector, and identify whether the third vehicle is in a blind spot of the vehicle according to the relative location of the vehicle to the third vehicle.

6. A method comprising:
receiving an image, from a millimeter wave (mmWave) antenna including a plurality of light elements and active antenna elements in a predefined configuration surrounding a lensless camera element, of a second mmWave antenna of a second vehicle via the lensless camera of the mmWave antenna;
identifying a scale and angle of rotation between the mmWave antenna and the second mmWave antenna based on the image, including utilizing a Fourier transform to estimate translation, rotation, and scaling between the image and a predefined image included in a library of shapes by applying a discrete Fourier transform (DFT) matrix to the image, the DFT matrix being generated according to a mathematical representation of the plurality of light elements of the mmWave antenna, the library of shapes including images representing different layouts of the plurality of light elements for different layouts of mmWave antenna, the predefined image illustrating a pattern that corresponds to a layout of the plurality of light elements of the second mmWave antenna;
computing phase angles for the active antenna elements of the mmWave antenna according to the scale and angle of rotation; and
transmitting data using the active antenna elements to the second vehicle, according to the computed phase angles, to form a beam targeted at the second mmWave antenna of the second vehicle.

7. The method of claim 6, further comprising utilizing a Kalman filter to compute the phase angles for the active antenna elements.

8. The method of claim 6, further comprising receiving, via an ad-hoc communication antenna utilizing a radial radiation pattern to provide data transmission, information related to a relative position of the vehicle to the second vehicle.

9. The method of claim 6, further comprising:
determining, according to the scale and angle of rotation, a first vector of a relative location of the vehicle to the second vehicle,
receiving, from the second vehicle, a second vector of a relative location of the second vehicle to a third vehicle,
determining a relative location of the vehicle to the third vehicle according to the first vector and the second vector, and
identifying whether the third vehicle is in a blind spot of the vehicle according to the relative location of the vehicle to the third vehicle.

10. The method of claim 9, further comprising:
receiving, from the second vehicle, a third vector of a relative location of the third vehicle to a fourth vehicle,
determining a relative location of the vehicle to the fourth vehicle according to the first vector, the second vector, and the third vector, and
identifying whether the third vehicle is in a blind spot of the vehicle according to the relative location of the vehicle to the third vehicle.

11. A system for a vehicle comprising:
a millimeter wave (mmWave) antenna, including a plurality of light elements and active antenna elements in a predefined configuration surrounding a lensless camera element;
an ad-hoc communication antenna configured to operate utilizing a radial radiation pattern to provide data transmission; and
an antenna controller configured to
receive, via the ad-hoc communication antenna, information related to a relative position of the vehicle to a second vehicle,
receive an image of a second mmWave antenna of the second vehicle via the lensless camera of the mmWave antenna,
identify a scale and angle of rotation between the mmWave antenna and the second mmWave antenna based on the image, including to utilize a Fourier transform to estimate translation, rotation, and scaling between the image and a predefined image included in a library of shapes by applying a discrete Fourier transform (DFT) matrix to the image, the DFT matrix being generated according to a mathematical representation of the plurality of light elements of the mmWave antenna, the library of shapes including images representing different layouts of the plurality of light elements for different layouts of mmWave antenna, the predefined image illustrating a pattern that corresponds to a layout of the plurality of light elements of the second mmWave antenna,
compute phase angles for the active antenna elements of the mmWave antenna according to the scale and angle of rotation by utilize a Kalman filter, and
transmit data using the active antenna elements to the second vehicle, according to the computed phase angles, to form a beam targeted at the second mmWave antenna of the second vehicle.

12. The system of claim 11, wherein the antenna controller is further configured to
determine, according to the scale and angle of rotation, a first vector of a relative location of the vehicle to the second vehicle,
receive, from the second vehicle, a second vector of a relative location of the second vehicle to a third vehicle,
determine a relative location of the vehicle to the third vehicle according to the first vector and the second vector, and
identify whether the third vehicle is in a blind spot of the vehicle according to the relative location of the vehicle to the third vehicle.

13. The system of claim 12, wherein the antenna controller is further configured to
receive, from the second vehicle, a third vector of a relative location of the third vehicle to a fourth vehicle,
determine a relative location of the vehicle to the fourth vehicle according to the first vector, the second vector, and the third vector, and
identify whether the third vehicle is in a blind spot of the vehicle according to the relative location of the vehicle to the third vehicle.

* * * * *